(12) United States Patent
Schram

(10) Patent No.: US 9,529,186 B1
(45) Date of Patent: Dec. 27, 2016

(54) ELECTROWETTING DISPLAY DEVICE

(71) Applicant: Amazon Technologies, Inc., Seattle, WA (US)

(72) Inventor: Ivar Schram, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/317,404

(22) Filed: Jun. 27, 2014

(51) Int. Cl.
*G02B 26/00* (2006.01)

(52) U.S. Cl.
CPC .................. *G02B 26/005* (2013.01)

(58) Field of Classification Search
CPC .................................... G02B 26/005
USPC ........................................ 359/290
See application file for complete search history.

(56) References Cited

U.S. PATENT DOCUMENTS

| 2009/0169806 A1* | 7/2009 | Lo et al. | G02B 26/005 428/119 |
| 2013/0301105 A1* | 11/2013 | Kim et al. | G02B 26/005 359/290 |
| 2014/0016175 A1* | 1/2014 | Kim et al. | G02B 26/005 359/290 |
| 2014/0029080 A1 | 1/2014 | Hwang | |

FOREIGN PATENT DOCUMENTS

| WO | 2009/133079 A1 | 11/2009 |
| WO | 2013/087858 A1 | 6/2013 |

* cited by examiner

*Primary Examiner* — James Jones
(74) *Attorney, Agent, or Firm* — EIP US LLP

(57) ABSTRACT

An electrowetting display device includes a first support plate including a first wall and a second support plate including a spacer. The spacer protrudes from the second support plate towards the first support plate. The device includes a spacer contact surface for contact by a surface of the spacer, which at least partly overlaps the spacer contact surface. The spacer contact surface is at least partly formed by an enlarged wall portion of the first wall. The enlarged wall portion is enlarged compared with a different portion of the first wall.

28 Claims, 4 Drawing Sheets

ELECTROWETTING DISPLAY DEVICE

BACKGROUND

Electrowetting display devices are known. In an example of a known electrowetting display device, a first and a second fluid, immiscible with each other, are confined between a first support plate and a second support plate. The first fluid is confined in picture elements, i.e. pixels, of such a device by walls.

Displacement of the first and second support plates relative to each other may cause unwanted effects. For example, pressure exerted on the second support plate, for example by a finger, may cause the second support plate to move towards the first support plate. If the distance between the support plates becomes small enough, the first fluid will adhere to the second support plate. This may be referred to as a "lowered ceiling effect". If a pressure pulse is exerted on the second support plate, a shock wave may be created, which may cause the first fluid to flow over a picture element wall. This may be referred to as a "tsunami effect".

Spacers between the first and second support plates may be used to reduce the displacement of the first and second support plates relative to each other. However, they can be unreliable; for example, a spacer extending from the second support plate may not correctly align with part of the first support plate the spacer is intended to contact. Such misalignment can reduce the functionality of the spacer and therefore the robustness of the display device.

It is desirable to provide a more robust electrowetting display device, for example with a reduced susceptibility to the unwanted effects described above.

DETAILED DESCRIPTION

Figure 1:
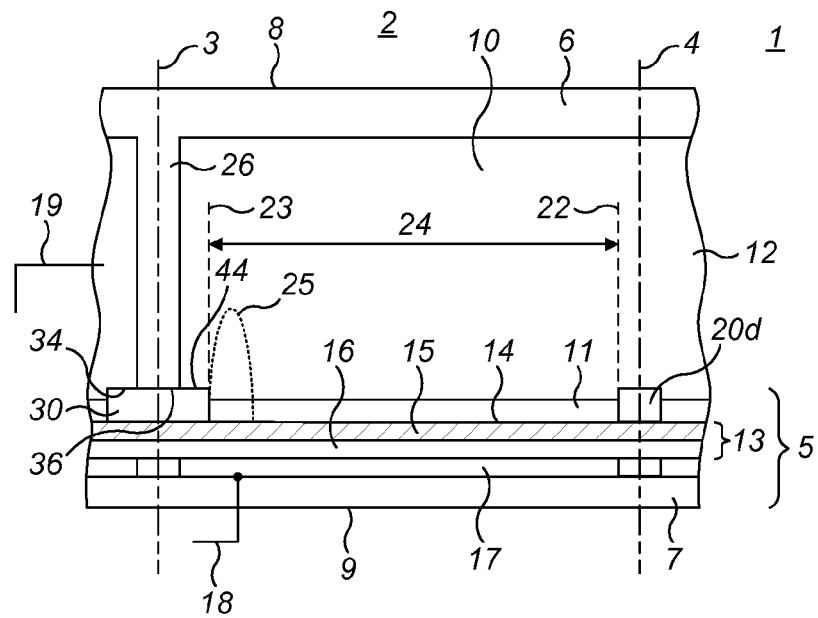
FIG. 1 shows schematically a cross-section of a picture element of an example electrowetting display device.

FIG. 1 shows a diagrammatic cross-section of part of an example of an electrowetting display device 1, which may be referred to as a display device, including a plurality of picture elements or display elements 2, one of which is shown in the Figure and which may also be referred to as an electrowetting cell. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may each include a glass or polymer substrate and may be rigid or flexible.

The display device has a viewing side 8 on which an image or display formed by the display device can be viewed and a rear side 9. In the Figure a surface of the first support plate 5, which surface is in this example a surface of a substrate 7, defines the rear side 9; a surface of the second support plate 6 defines the viewing side 8; alternatively, in other examples, a surface of the first support plate may define the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to show different colors.

A first fluid 11 and a second fluid 12 are positioned between the first 5 and second 6 support plates, in the space 10. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. The second fluid may be transparent; it may instead be colored, absorbing. The first fluid is electrically non-conductive and may for instance be an alkane like hexadecane or may be an oil such as silicone oil.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a color. In examples to be described below, the first fluid is black and therefore absorbs substantially all parts of the optical spectrum, for example in the visible light spectrum. The term "substantially absorbs" includes a degree of variation, therefore the first fluid may not absorb all wavelengths, but the majority of wavelengths within a given spectrum such as the visible spectrum, so as to perform the function of the first fluid in the element. The first fluid is therefore configured to absorb substantially all light incident on the first fluid. For example the first fluid may absorb 90% or more of light in the visible spectrum and incident on the first fluid.

The support plate 5 includes an insulating layer 13. The insulating layer may be transparent or reflective. The insulating layer 13 may extend between walls of a display element; the walls are described below. To avoid short circuits between the second fluid 12 and electrodes arranged under the insulating layer, layers of the insulating layer may extend uninterrupted over a plurality of display elements 2, as shown in the Figure. The insulating layer has a surface 14 facing the space 10 of the display element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material like silicon oxide or silicon nitride or a stack of these (for example, silicon oxide—silicon nitride—silicon oxide) or an organic material like polyimide or parylene.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer (not illustrated). In some examples, further layers may be arranged between the insulating layer 13 and the electrode 17. The electrode 17 can be of any desired shape or form. In examples, each display element 2 may include more than one such electrode as part of the support plate 5. The electrode 17 of a display element is supplied with voltage signals by a signal line 18, schematically indicated in the Figure.

A second signal line 19 is connected to an electrode that is in contact with the conductive second fluid 12. This electrode may be common to all elements, when they are fluidly interconnected by and share the second fluid, uninterrupted by walls. The display element 2 can be controlled by a voltage V applied between the signal lines 18 and 19. The electrodes 17 on the substrate 7 are coupled to a display control apparatus. In a display device having the picture elements arranged in a matrix form, the electrodes can be coupled to a matrix of control lines on the substrate 7.

The first fluid 11 in this example is confined to a display element by walls that follow the cross-section of the display element. The walls are described in more detail below, with reference to FIG. 2. The extent of the display element, indicated by the dashed lines 3 and 4, is defined by the center of the walls. The area of the surface 14 between the walls of a display element, indicated by the dashed lines 22 and 23, is called the display area 24, over which a display effect occurs. The display area 24 of the display element 2 of FIG. 1 may be referred to below as a first display area 24. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

In examples described herein, the first fluid 11 adjoins at least part of the display area 24. When a zero or substantially zero voltage is applied between the electrodes, i.e. when the electrowetting element is in an off state, the first fluid 11 forms a layer between the walls, as shown in FIG. 1. Application of a voltage will contract the first fluid, for example against a wall as shown by the dashed shape 25 in FIG. 1. The controllable shape of the first fluid, in dependence on the magnitude of applied voltage, is used to operate the picture element as a light valve, providing a display effect over the display area 24. For example, switching the fluids to increase adjoinment of the second fluid 12 with the display area 24 may increase the brightness of the display effect provided by the element.

This display effect determines the display state an observer will see when looking towards the viewing side of the display device. The display state can be from black to white with any intermediate grey state; in a color display device, the display state may also include color.

The second support plate 6 includes at least one spacer 26 protruding from the second support plate 6 in a direction towards the first support plate 5. Protruding may, for example, refer to an extending, jutting, bulging, projecting or swelling of the spacer in a direction towards the first support plate 5. For example, where a part of the second support plate is closer to the first support plate than a different part of the second support plate, the closer part of the second support plate may be considered to protrude from the second support plate and therefore form the spacer. For example, the part of the second support plate forming the spacer may have a greater height than the different part of the second support plate, a height of the spacer being taken in a direction perpendicular to a plane of the display area 24. The spacer 26 may be used to reduce the lowered ceiling and tsunami effects, as will be described below.

Figure 2:
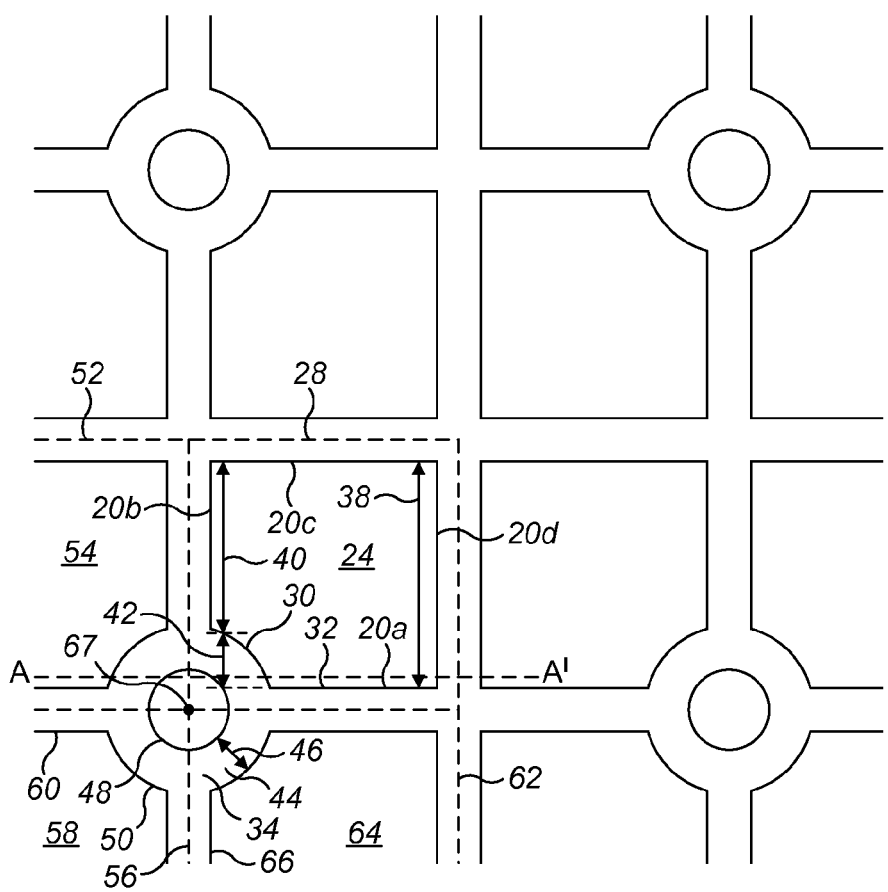
FIG. 2 shows schematically a plan view of an example array of electrowetting picture elements including the picture element of FIG. 1.

FIG. 2 shows a plan view of an example array of electrowetting picture elements including the picture element of FIG. 1. The cross-section of the example picture element 2 of FIG. 1 is taken along the line A to A' in FIG. 2. The lateral extent of the picture element of FIG. 1, corresponding to the dashed lines 3 and 4 in FIG. 1, is indicated in FIG. 2 by the dashed line 28.

As shown in FIGS. 1 and 2, the first support plate 5 includes a first display area 24, with a first wall 20a positioned along a first side of the first display area 24. The first display area 24 is surrounded by the first wall 20a and three other walls 20b, 20c, 20d.

The first wall 20a has an enlarged wall portion 30, which enlarged wall portion 30 is enlarged compared with a different portion 32 of the first wall 20a. The enlarged wall portion 30 at least partly forms a spacer contact surface 34 for contact by a surface 36 of the spacer 26, which surface 36 of the spacer 26 at least partly overlaps the spacer contact surface 34. An overlap in examples refers to the surface of the spacer being positioned over the spacer contact surface so as to at least partly cover the spacer contact surface. The spacer contact surface may be considered to be overlapped or covered in this way where the surface of the spacer contacts the spacer contact surface, for example where the spacer contact surface and the surface of the spacer lie in substantially the same plane, as shown in FIG. 2, in other examples where there is a gap or space between the surface of the spacer and the spacer contact surface, or in further examples where the spacer is received at least partly within a recess of the enlarged wall portion, as will be described later. The term "substantially the same plane" in examples refers to surfaces which are within the same plane within acceptable manufacturing tolerances. For example, an overlap may occur where a projection of the surface of the spacer into a plane of the spacer contact surface is at least partly coincident with the spacer contact surface.

The inventor has now realized that compared with known systems an enlarged wall portion may be used to provide a larger spacer contact surface. This improves the alignment between the spacer and the spacer contact surface and between the first support plate and the second support plate; in particular, with a larger spacer contact surface, the likelihood of the spacer surface contacting a surface of the first support plate other than the spacer contact surface is reduced. In examples in which the spacer contact surface is outside the display area, the ability to easily align the spacer with the spacer contact surface reduces the chance of the spacer contacting the display area and reducing the display quality. Furthermore, for an electrowetting display device comprising a plurality of display elements, the manufacturing tolerances for each display element may be less strict compared with known devices.

In some examples, a width of the display area taken across the display area may be reduced in correspondence with a difference in wall width between the enlarged wall portion and the different wall portion; a display area of a picture element for providing a display effect may therefore be smaller than known displays. Nevertheless, it has been found that the above-described benefits of the enlarged wall portion outweigh the possible reduction in size and therefore area for transmitting light of the display area in some examples.

In the example of FIG. 2 the enlarged wall portion 30 reduces the space available on the first support plate 5 for the display area 24 compared with known systems, such that the display area 24 has a first display area width 38 of the first display area 24 which is greater than a second display area width 40 of the first display area 24. The first display area width 38 is taken from a point of the different portion 32 of the first wall 20a to a first opposite point on the opposite side, the opposite side being opposite to and across the display area 24 from the first side. The second display area width 40 is taken from a point of the enlarged wall portion 30 on the first side of the first display area 24 to a second opposite point on an opposite side of the first display area 24. The first display area width 38 is substantially parallel to the second display area width 40. The term "substantially parallel" indicates a degree of variation from a strictly parallel relationship. For example, an angle between the first display area width 38 and the second display area width 40 may be zero, approximately zero or in the range of 0 to 10 degrees.

In FIG. 2, the first side of the first display area 24 is the side along the first wall 20a, i.e. a first side of a perimeter of the first display area; and the opposite side of the first display area 24 is the side along the opposite wall, i.e. an opposite side of the first display area perimeter, the third wall 20c. The first side and the opposite side are substantially parallel in this example. The term "substantially parallel" is as described above and may include an angle between a tangent to the first side and a tangent to the opposite side which is zero or approximately zero, for example in the range of 0 to 10 degrees. In other examples, the angle between the first side and the opposite side may be non-zero; for example the angle may be between 10 and 45 degrees. Two sides may also be considered to be opposite to each other if they are facing each other across the first display area.

The difference 42 between the first display area width 38 and the second display area width 40 may correspond with and in the example of FIG. 2 is equal to the difference between the width of the different wall portion 32 at the point of the different portion at which the first display area width 38 is taken and the width of the enlarged wall portion 30 at the point of the enlarged wall portion at which the second display area width 40 is taken, the widths all being taken in a direction substantially parallel to each other.

The first display area width 38 and the second display area width 40 are taken in a direction substantially perpendicular to the first side of the first display area 24 at the different wall portion 32 in the example of FIG. 2. The term "substantially perpendicular" includes an angle between the direction and the tangent to the first side of the first display area 24 which is 90 degrees, or approximately 90 degrees, for example in the range of 80 to 100 degrees. In other examples, the first display area width 38 and the second display area width 40 may be taken in a different direction, provided that the first display area width 38 and the second display area width 40 are substantially parallel, as described above. For example, the first display area width 38 and the second display area width 40 may be taken at an angle relative to the normal to the first side of the first display area 24 at the different wall portion 32.

A first side of the first display area 24 may be non-linear for a part of the first side adjoining the first wall 20a. Non-linear may refer to a side which does not follow a straight line. The shape of the first side of the first display area 24 corresponds with the shape of the first wall 20a which it adjoins. Therefore, if the first wall 20a is non-linear, i.e. not a straight line, for example due to the enlarged wall portion 30, the first side of the first display area 24 will be non-linear. In the example of FIG. 2, the shape of the first wall 20a is linear in the different wall portion 32 region and curved in the enlarged wall portion 30 region, which forms a quarter circle. Thus the overall shape of the first side of the first display area 24 adjoining the enlarged wall portion 30 and the different wall portion 32 is non-linear in FIG. 2.

In the example of FIG. 2, the enlarged wall portion 30 is a widening of the first wall 20a compared with the different portion 32 of the first wall 20a, the widening being taken in a direction parallel to a plane of the first display area 24. However, in other examples (not illustrated), the enlarged wall portion 30 may be a heightening of the first wall 20a compared with the different portion 32 of the first wall 20a, the heightening being taken in a direction perpendicular to the plane of the first display area 24. In examples, the term "heightening" refers to the enlarged wall portion 30 being higher, i.e. taller or having a larger height dimension than the different portion 32 of the first wall 20a in a direction perpendicular to the plane of the first display area 24. In still further examples, the enlarged wall portion 30 may comprise both a widening and a heightening, the widening and heightening being as defined above. For example, the enlarged wall portion 30 may be a bulge, a protrusion or a mushroom shaped wall portion compared with the different portion.

Although the walls in FIG. 1 are shown as structures protruding from the insulating layer 13, they may instead be a surface layer of the support plate that repels the first fluid, such as a hydrophilic or less hydrophobic layer. For example, the walls may have a height of substantially zero on the surface of the insulating layer, with the height being taken in a direction perpendicular to a plane of the first support plate. The term "substantially zero" in examples refers to a height which is minimal, for example as close to zero within acceptable manufacturing tolerances, whilst providing a reduced hydrophobicity.

At least part of the spacer contact surface may be more wettable to the second fluid than to the first fluid. For example, where the second fluid is water or a salt solution such as a solution of potassium chloride in water and the first fluid is an alkane or an oil, at least part of the spacer contact surface may be hydrophilic or less hydrophobic than the surface 14 of the insulating layer 13. With the spacer contact surface being more wettable to the second fluid than to the first fluid, it is more energetically favorable for the second fluid to adjoin the region of the spacer contact surface not contacted by the spacer. This reduces the extent which the first fluid wets the spacer contact surface and accordingly reduces the chance that the first fluid will move over the spacer contact surface into an adjacent display element. This improves the quality of images displayed by the display device.

The surface 36 of the spacer 26 may contact at least part of the spacer contact surface 34, as shown in FIGS. 1 and 2. Contact may refer to touching or adjoining. This reduces the extent the first and second support plates may be displaced or deformed relative to each other, as the spacer gives structural support between the support plates thereby improving the robustness of the display device. In the example of FIGS. 1 and 2, an area of the spacer contact surface 34 is larger than an area of the surface 36 of the spacer 26. In other words, the part of the spacer contact surface 34 in contact with the surface 36 of the spacer 26 is a sub-area of the spacer contact surface 34. In other examples, the area of the spacer contact surface may be substantially the same as the area of the surface of the spacer. "Substantially the same area" refers in examples to the area of the spacer contact surface being the same as the area of the surface of the spacer within acceptable manufacturing tolerances; for example, the ratio of the area of the spacer contact surface to the area of the spacer surface may be between 1:0.9 to 1:1.1. In other examples, the surface of the spacer may partly contact the spacer contact surface. For example, the spacer contact surface and the surface of the spacer may be offset such that there is a region in which the spacer surface and the spacer contact surface are not in contact. The spacer may form an overhang in the region in which the spacer and the spacer contact surface are not in contact. In this region, the surface of the spacer may overlap with the first display area rather than the spacer contact surface.

In the example of FIGS. 1 and 2, the spacer contact surface 34 is entirely formed by a surface of the enlarged wall portion 30 of the first wall 20a which faces towards the spacer 26. However, in other examples, the spacer contact surface may be partly formed by the enlarged wall portion and partly formed by another surface, for example a surface of the different portion of the first wall. This may be the case, for example, where the spacer overlaps or is in contact with both a part of the enlarged wall portion and a part of another, different, surface, for example the surface of the different portion of the first wall.

As shown in FIGS. 1 and 2, the spacer contact surface 34 may be planar, i.e. substantially flat, in plan view. The spacer contact surface 34 may in examples be substantially circular in plan view. In the example of FIGS. 1 and 2, the spacer contact surface 34 is both planar and substantially circular in plan view however, in other examples, the spacer contact surface may be either planar or substantially circular. In other examples, the spacer contact surface 34 may be substantially rectangular, substantially square or substantially elliptical in plan view.

The surface 36 of the spacer 26 may also be planar in plan view and may, in examples, be substantially circular, as in the example of FIGS. 1 and 2 in which the spacer 26 is cylindrical, with a substantially circular cross-section. In other examples, the spacer may have a different shape, such as a tapering shape (described below with reference to FIG. 4). Alternatively, the spacer may be a cuboid and the surface of the spacer in plan view may be substantially rectangular or substantially square. In other examples, the spacer may be a pyramid, frustoconical, cone shaped or an irregular or asymmetric shape. For example, the spacer may have a shape such that the surface of the spacer in plan view is substantially elliptical.

References to "substantially" in relation to the shape of the spacer contact surface 34 or surface 36 of the spacer 26 include a degree of variation within acceptable manufacturing tolerances. For example, a spacer contact surface 34 may be considered to have a "substantially circular" shape where it is circular within acceptable manufacturing tolerances. The spacer contact surface may have the same or a similar shape in plan view to that of the surface of the spacer, in examples. However, in other examples, the spacer contact surface and the surface of the spacer may have different shapes in plan view, for example due to manufacturing constraints. For example, the surface of the spacer in plan view may be substantially square and the spacer contact surface in plan view may be substantially circular. The term "plan view" used herein refers in examples to a cross-section, for example a cross-section taken in a direction parallel to a plane of the first display area.

A shape of the spacer contact surface may correspond with a shape of the surface of the spacer to make it easier to align the two surfaces. This may improve contact between the spacer 26 and the spacer contact surface 34, improving the robustness of the display device 1 when subjected to pressure on the first 5 and/or second 6 support plates. For example, the spacer may have a pyramid-shaped tip which may be received by or contactable with a corresponding pyramid-shaped recess forming a spacer contact surface. In other examples, the spacer contact surface 34 and the surface 36 of the spacer 26 may be planar and lie in substantially the same plane, as in FIGS. 1 and 2. In other examples, the spacer contact surface 34 and/or the surface 36 of the spacer 26 may be non-planar.

In examples, a part of the spacer contact surface contacts the surface of the spacer and the spacer contact surface comprises a border area formed by a part of the spacer contact surface not in contact with the surface of the spacer and surrounding the part of the spacer contact surface contacting the surface of the spacer. In the examples of FIGS. 1 and 2, with the spacer contact surface 34 contacting, i.e adjoining, the surface 36 of the spacer 26 and where the spacer contact surface 34 is larger than the surface 36 of the spacer 26, a part of the spacer contact surface 34 not adjoined by the surface 36 of the spacer 26 forms a border area 44 surrounding a part of the spacer contact surface 34 adjoined by the surface 36 of the spacer 26. The term "border area" in examples refers to a bank, margin or perimeter area surrounding the part of the spacer contact surface 34 in contact with the surface 36 of the spacer 26. In examples where the area of the spacer contact surface 34 is substantially the same as the area of the surface 36 of the spacer 26, there will be substantially no border area. "Substantially no border area" in examples refers to a border area which is negligible within acceptable manufacturing tolerances or for example a border area which is zero or approximately zero, for example a border of less than 90% of a total area of the spacer contact surface 34.

Figure 3:
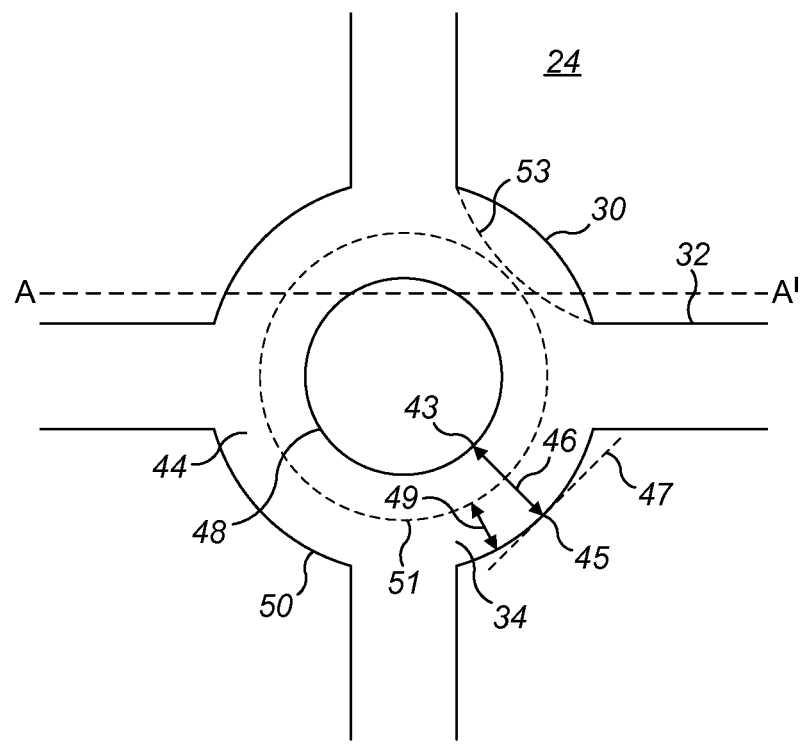
FIG. 3 shows schematically a close-up of part of the plan view of the example array of electrowetting picture elements of FIG. 2.

The border area 44 of FIG. 2 is shown in close-up in FIG. 3. As shown in the example of FIG. 3, the border area 44 may have a radial extent 46, i.e. a distance, between a point 43 on a perimeter 48 of the part of the spacer contact surface 34 adjoined by the surface 36 of the spacer 26 and a point 45 on a perimeter 50 of the spacer contact surface 34. In this example the radial extent may be substantially perpendicular to a tangent 47 of the perimeter 50 of the spacer contact surface 34. The radial extent of the border area 44 may be at least equal to, i.e. equal to or greater than, a maximum distance 49 across the border area 44 which is wettable by the first fluid 11. In other words a minimum radial extent of the border area is selected to be equal to or greater than the maximum distance 49. The maximum distance 49 is substantially perpendicular to a tangent of the perimeter 50 of the spacer contact surface 34 and is taken from the perimeter 50 of the spacer contact surface 34 across the border area 44. The term "substantially perpendicular" may be as described above, i.e. an angle between the direction of the distance and the tangent may be 90 degrees, or approximately 90 degrees, for example in the range of 80 to 100 degrees.

As explained above with reference to FIG. 1, when a given voltage is applied to the display element 2, the first fluid 11 may contract or be displaced from the first display area 24, as shown by the dashed shape 25 in FIG. 1. When the first fluid contracts, the first fluid may partly wet one or more of the display element walls, including one or more of the enlarged wall portion, the different wall portion and another portion of the walls in examples. For example, the first fluid may wet any part of the one or more display element walls including at least a part of a surface of a wall adjacent to the display area or at least a part of a surface of a wall closest to the second support plate. As the skilled person would appreciate, such wetting is limited, for example due to the height of the wall, especially if the wall material is less wettable to the first fluid than to the second fluid. Therefore, energy limitations, i.e. with a certain degree of wetting being energetically unfavorable, can determine a maximum distance across the border area which is wettable by the first fluid; this can depend on many factors including the materials used to form the first fluid and the first wall, a height of the first wall and a volume of the first fluid.

In FIG. 3, a limited area of the border area 44 is wettable by the first fluid 11, as defined by the maximum distance 49, with the limited area being shown with a dashed line indicating the limit 51 of the limited area. In examples, the first fluid 11 may wet anywhere on the limited area, i.e. on the part of the border area 44 between the perimeter 50 of the spacer contact surface 34 formed by the enlarged wall portion 30 and the limit 51 of the limited area, determined by the maximum distance 49. In other examples, the first fluid may not wet the border area and may be confined to a display area, for example the first display area 24. In FIG. 3 an example of a maximum extent 53 of the border area 44 wetted by the first fluid 11 when a given voltage is applied to the display element 2 is illustrated with a dashed line. This maximum extent 53 lies within the limited area and therefore between the limit 51 and the perimeter 50 of the spacer contact surface 34. When a different voltage is applied, the first fluid 11 may wet anywhere up to the limit 51. The radial extent 46 of the border area 44 is greater than the maximum extent 53 wetted by the first fluid 11 when the given voltage is applied as shown in the example of FIG. 3 and greater than the maximum distance 49 across the border area 44 wettable by the first fluid 11.

The skilled person will readily appreciate suitable techniques to determine the maximum distance across the border area wettable by the first fluid and thus the minimum radial extent of the border area. For example, the skilled person could arrange a picture element with a first radial extent of the border area. With this first radial extent, a suitable voltage may be applied to the picture element to fully retract the first fluid. If the first fluid wets the full radial extent of the border area when fully retracted (and therefore tending to cover the border area), the first radial extent is less than the minimum radial extent. This test may be repeated with different radial extents of the border area until a minimum radial extent is determined at which the first fluid does not wet the entire radial extent of the border area when fully retracted; this is the minimum radial extent.

The radial extent 46 of the border area 44 in FIGS. 2 and 3 is substantially equal around the perimeter 50 of the spacer contact surface 34 adjoined by the surface 36 of the spacer 26. For example, the radial extent of the border area may be substantially radially symmetric in shape and/or size. The term "substantially equal" used herein refers in examples to measurements, for example of an extent, a width, a height or a thickness, which are equal, i.e. the same, within acceptable manufacturing tolerances. In this example, a center of the surface 36 of the spacer 26 is coincident with, i.e. aligned with, a center of a surface of the enlarged wall portion 30 forming at least part of the spacer contact surface 34. In other examples, the center of the surface 36 of the spacer 26 may not be coincident with the center of the surface of the enlarged wall portion 30; for example, the center of the surface 36 of the spacer 26 may be off-center or misaligned with respect to the center of the surface of the enlarged wall portion 30. In such examples, there may be an overhang between the spacer 26 and the enlarged wall portion 30, as described above. The radial extent 46 of the border area 44 may vary around the perimeter 50 of the spacer contact surface 34, for example where the center of the surface 36 of the spacer 26 is not aligned with the center of the surface of the enlarged wall portion 30 or where the shape of the surface 36 of the spacer 26 is different from that of the spacer contact surface 34. For example, the radial extent of the border area may be unequal around the perimeter of the spacer contact surface adjoined by the surface of the spacer. The term "unequal" used herein refers to examples in which measurements, for example of an extent, a width, a height or a thickness, of the radial extent of the border area at a point on the perimeter of the spacer contact surface is larger or smaller than measurements of the radial extent of the border area at a different point on the perimeter of the spacer contact surface. For example, the border area may have a shape and/or size which is radially asymmetric.

In examples, the first fluid is absent from between the spacer contact surface and the surface of the spacer. Between the spacer contact surface and the surface of the spacer may refer to a gap or space between the surfaces in a region where they are not in contact with each other or to a border area as described above. Absent may refer to an amount of first fluid between the spacer contact surface and the surface of the spacer which is negligible.

For example, where the first fluid is present on the border area with the radial extent being less than the minimum radial extent and with the first fluid being incident on a gap between the spacer contact surface and the surface of the spacer, capillary action may draw the first fluid into the gap. However, with the radial extent of the border area being greater than the maximum distance, the first fluid in examples will not be incident on the gap and therefore will not be drawn into it by capillary action. Such first fluid in the gap is undesirable, for example as it impairs functionality of the spacers but also can reduce a first fluid volume in a display element and deteriorate the quality of a display effect provided by the display element.

In examples in which the first fluid is absent from between the spacer contact surface and the surface of the spacer, transfer or movement of the first fluid from the display element 2 to another display element, such as an adjacent display element, may be reduced or avoided. This improves the display quality, which may be reduced where the first fluid is able to move between display elements such that each element comprises a different amount of first fluid.

In FIG. 2, the first support plate 5 includes a second wall 20*b* positioned along a second side of the first display area 24, the first wall 20*a* joining the second wall 20*b* at a wall junction 67, the spacer contact surface 34 being formed as part of the wall junction 67. The wall junction may be a point or region at which two or more walls meet, join, merge or are otherwise in contact with each other. The wall junction may be at a corner of a display element, with the enlarged wall portion which forms at least part of the spacer contact surface being located at the wall junction in the corner of the display element, as shown in the example of FIG. 2. In other examples, the spacer contact surface is formed at a different location on the first wall, as will be described later with reference to FIG. 6.

The array of electrowetting display elements in the example of FIG. 2 includes a first picture element including the first display area 24. FIG. 2 also shows a second picture element, with a lateral extent indicated by a dashed line 52, including a second display area 54. A second wall 20*b* is positioned along a second side of the first display area 24, the second wall 20*b* separating the first display area 24 from the second display area 54. A third picture element, with a lateral extent indicated by a dashed line 56, includes a third display area 58. A third wall 60 is positioned along a side of the third display area 58, the third wall 60 separating the second display area 54 from the third display area 58. A fourth picture element, with a lateral extent indicated by a dashed line 62, includes a fourth display area with a fourth wall 66 being positioned along a side of the fourth picture element. The first 20*a*, second 20*b*, third 60 and fourth 66 walls join each other at a wall junction 67. The spacer contact surface 34 in FIG. 2 is formed as part of the wall junction 67. In the example of FIG. 2, the first 20*a*, second 20*b*, third 60 and fourth walls 66 meet at a four-way crossing centered on the wall junction 67, with an angle between each wall and its neighboring, i.e. adjacently in contact with, wall being substantially 90 degrees, where "substantially 90 degrees" refers in examples to an angle which is approximately 90 degrees, for example in the range of 80 to 100 degrees. In other examples, the walls may be arranged differently, for example with differing angles between each wall and its neighbor.

In examples, one or more of the second wall, the third wall or the fourth wall includes a further enlarged wall portion, which further enlarged wall portion is enlarged compared to a different portion of the respective one of the second wall, the third wall and the fourth wall, the spacer contact being formed at least partly by the further enlarged wall portion. The enlarged wall portion and each of the further enlarged wall portions may together form a combined enlarged wall portion.

In the example of FIG. 2, each of the first 20*a*, second 20*b*, third 60 and fourth walls 66 comprise an enlarged wall portion, thereby forming a combined enlarged wall portion. Each enlarged wall portion forms a quarter circle such that the spacer contact surface 34 formed by the combined enlarged wall portion is substantially circular. As explained above, the spacer contact surface 34 may be other shapes, for example rectangular, square or elliptical.

In FIG. 2, the spacer contact surface 34 is formed symmetrically around the wall junction 67 such that the center of the circle formed by the spacer contact surface 34 is coincident with the point at which the first 20*a*, second 20*b*, third 60 and fourth walls 66 meet i.e. the wall junction 67. In other examples, the spacer contact surface may not be symmetric around the wall junction. This may be the case where fewer than four of the walls include an enlarged wall portion and/or where each enlarged wall portion is of a different shape or size.

Figure 4:
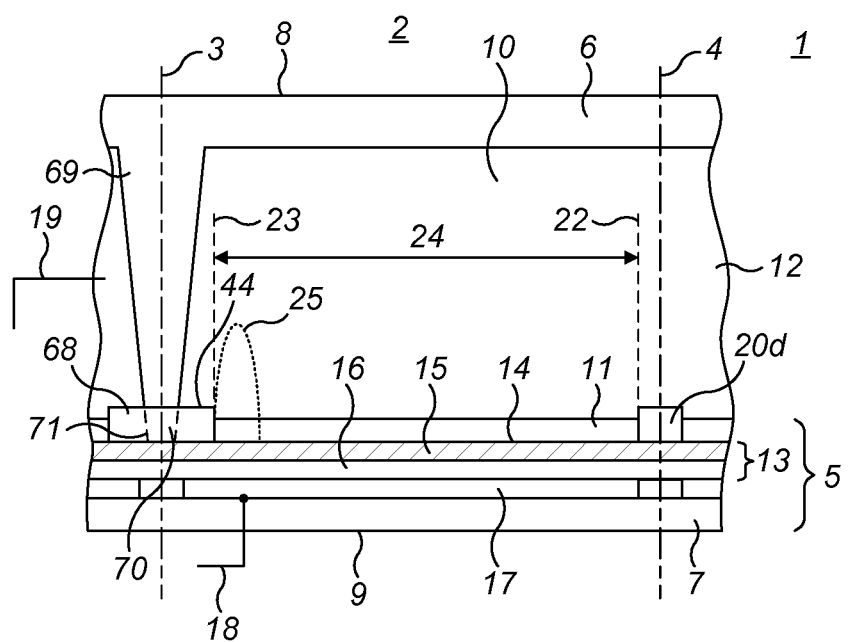
FIG. 4 shows schematically a cross-section of a picture element of another example electrowetting display device.

FIG. 4 shows a different example. Features are illustrated which are similar to those of FIGS. 1, 2 and 3; the same reference numerals are used and corresponding descriptions apply.

In FIG. 4, the enlarged wall portion 68 comprises a recess 70 shaped to receive at least part of the spacer 69. A recess may be a region of the enlarged wall portion with a smaller height compared with a different region of the enlarged wall portion, with the height of the enlarged wall portion being taken in a direction perpendicular to a plane of the first display area. A recess may, in examples, be a cut-out, depression, removed part, cavity or hole in the enlarged wall portion.

In FIG. 4, the recess 70 is a hole in the enlarged wall portion 68, which hole extends down to the surface 14 of the hydrophobic layer 15. The enlarged wall portion 68 thus forms a hollow cylinder, with the recess 70 in the center. In other examples in which the enlarged wall portion 68 comprises a recess 70, the enlarged wall portion 68 may be ring-shaped. The spacer 69 contacts the hydrophobic layer 15 through the recess 70 in this example, although in other examples the spacer may not contact the hydrophobic layer 15; in such examples, there may be a space or gap between the surface of the spacer and the hydrophobic layer 15 within the recess 70. In other examples, the recess 70 may extend partway through the enlarged wall portion 68 such that the recess 70 does not extend down to the hydrophobic layer 15.

In examples in which the enlarged wall portion comprises a recess, the spacer contact surface 71 may be an inner or interior surface of the recess. Where the recess extends down to the hydrophobic layer, the spacer contact surface 71 may comprise a surface of the hydrophobic layer contactable through the recess by the spacer.

The recess may have an opening with a shape corresponding with a cross-sectional shape of the spacer. For example, where the spacer is cylindrical i.e. with a circular cross-section, the recess may have an opening with a circular cross-section. The shape of the recess may vary along its length such that its cross-sectional shape at the opening is different from its cross-sectional shape further away from the opening. For example, away from the opening, the recess may be narrower. If the spacer has a substantially equal cross-section along its length, it may fit into the recess in the opening region but may not fit into the narrower part of the recess. In this way, the spacer may be partly contained within the recess and there may be a gap between the surface of the spacer and the bottom, or deepest part, of the recess, i.e. the part of the recess closest to the first support plate.

The spacer may have a tapered outer surface tapering in a direction towards the first support plate, at least a part of the tapered outer surface being in contact with, i.e. joining, an opening of the recess through which the spacer is received. Such joining may be a touching, contacting, meeting, interfitting, interlocking or wedging of the tapered outer surface and the opening of the recess.

The spacer 69 has a tapering shape in the example of FIG. 4, in which in this example the cross-sectional area of the spacer 69 at a point of the spacer 69 furthest away from the first support plate 5 is larger than the cross-sectional area of the spacer 69 at a point of the spacer 69 adjacent to the first support plate 5. In FIG. 4, the recess 70 also has a tapering shape, which corresponds with the tapering shape of the spacer 69, with the cross-sectional area of the recess 70 at a point of the recess 70 closest to the second support plate 6 being larger than the cross-sectional area of the recess 70 at a point of the recess 70 closest to the first support plate 5. A size of the part of the spacer 69 received by the recess 70 also corresponds with a size of the recess 70 so that the spacer 69 and recess 70 fit together snugly. In examples, the spacer is received within the recess, and the first support plate and the second support plate are joined together between the spacer and the recess. In the example of FIG. 4, due to the correspondence in shape and size between the spacer 69 and the recess 70, a join is formed between the outer surface of the spacer 69 and an inner surface of the recess 70 along the entire extent of, or throughout, the recess 70, for example within acceptable manufacturing tolerances.

In other examples than described above, the spacer 69 and the recess 70 may have different shapes and/or sizes. In such examples, part of the spacer within the recess may be in contact with or joining the recess; the rest of the spacer within the recess may be merely surrounded by the recess without touching it. In some examples, the outer surface of the spacer may join the surface of the recess at the opening of the recess without joining the surface of the recess at other points, as described above. In further examples, the recess may have a large opening such that there is a join between the outer surface of the spacer and the inner surface of the recess at a deeper part of the recess, i.e. a part of the recess closer to the first support plate than an opening of the recess, with no join at the opening of the recess.

Figure 5:
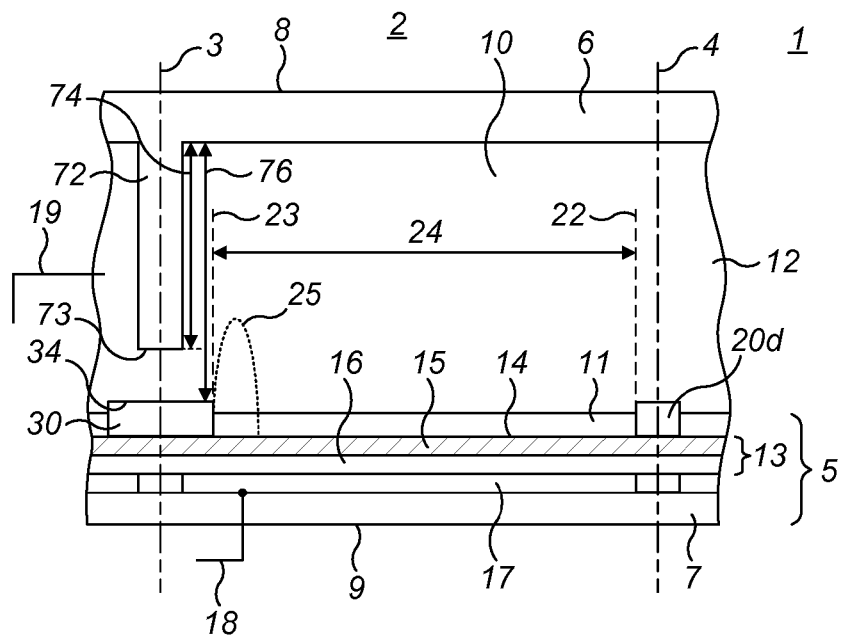
FIG. 5 shows schematically a cross-section of a picture element of a further example electrowetting display device.

In the examples described above with reference to FIGS. 1 to 4, the surface of the spacer contacts at least part of the spacer contact surface. However, in other examples, at least one of the first support plate or the second support plate are formed of at least one flexible material to be deformable such that, upon deformation of the at least one of the first support plate or the second support plate, the spacer is movable towards the enlarged wall portion to contact at least part of the spacer contact surface at least partly overlapped by the surface of the spacer. In these examples, the spacer may not contact the spacer contact surface unless at least one of the support plates is deformed. Such an example is shown in FIG. 5. Features are illustrated in FIG. 5 which are similar to those of FIGS. 1 to 4; the same reference numerals are used and corresponding descriptions apply.

In FIG. 5, the length 74 of the spacer 72 in a direction perpendicular to the plane of the first display area 24 is less than the distance 76 between a part of the second support plate 6 which does not form the spacer 72 and the spacer contact surface 34 in the same direction. In this example, the spacer 72 is not in contact with the spacer contact surface 34 when the first support plate 5 and the second support plate 6 are not deformed, in which case the spacer 72 and the spacer contact surface 34 are contactable. However, when at least one of the first support plate 5 and the second support plate 6 are deformed relative to each other, the distance between the second support plate 6 and the spacer contact surface 34 (which forms part of the first support plate 5) may be reduced. A deformation may be a bending of one or both of the support plates or a movement or displacement of a part or all of one or both of the support plates, for example due to the application of pressure, such as the pressure exerted by a finger or hand, on one or both of the support plates.

When one or both of the first and second support plates is deformed relative to each other such that the distance between the support plates is reduced, the spacer 72 is moved towards the spacer contact surface 34 which is at least partly formed by the enlarged wall portion 30. The movement of the spacer 72 may be due to a movement of the second support plate 6 and hence the spacer 72 itself (which is part of the second support plate 6). Alternatively, the spacer 72 may remain stationary and the first support plate 5 may move towards the surface 73 of the spacer 72, thereby reducing the distance between the first and second support plates 5 and 6. In further examples, both the first support plate 5 and the second support plate 6 are deformed so that both the spacer 72 and the spacer contact surface 34 move towards each other.

When the distance between the second support plate 6 and the spacer contact surface 34 is reduced to a distance substantially equal to the length 74 of the spacer 72 in a direction perpendicular to a plane of the first display area 24, the surface 73 of the spacer 72 will contact the spacer contact surface 34. If further pressure is applied to one or both of the support plates once the spacer 72 is in contact with the spacer contact surface 34, the contact between the spacer 72 and the spacer contact surface 34 will prevent the support plates from being deformed further, maintaining the distance between the first support plate 5 and the second support plate 6 at a distance substantially equal to the length 74 of the spacer 72.

Figure 6:
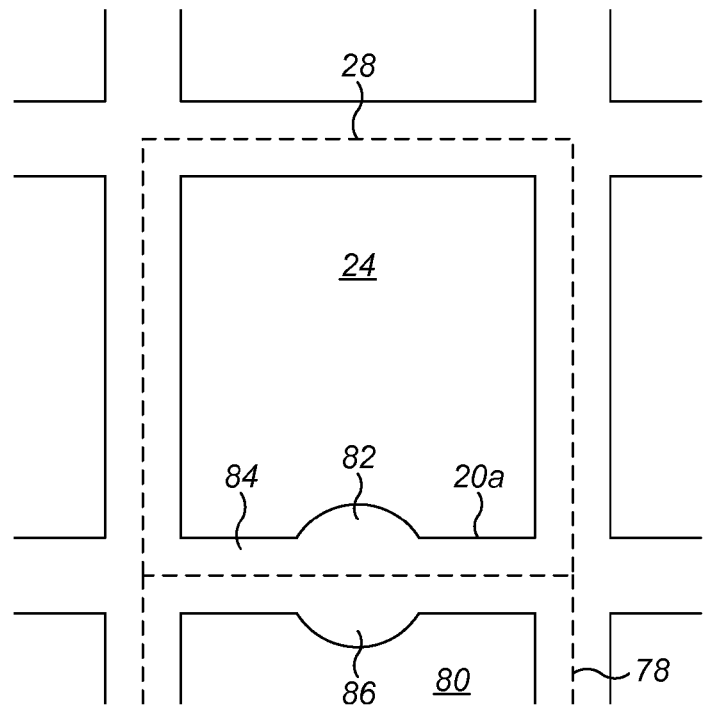
FIG. 6 shows schematically a plan view of an example array of electrowetting picture elements.

FIG. 6 shows a further example electrowetting display element. Features are illustrated in FIG. 6 which are similar to those of FIGS. 1 to 5; the same reference numerals are used and corresponding descriptions apply.

In the example described with reference to FIGS. 1 and 2, the spacer contact surface 34 is formed at a wall junction between first, second, third and fourth walls. In the example of FIG. 6, including a first picture element including a first display area and a second picture element including a second display area, with the first wall separating the first display area from the second display area and the first wall being positioned along a side of the second display, at least part of the enlarged wall portion of the first wall is positioned between the first display area and the second display area.

In FIG. 6, a first picture element including the first display area 24 is shown. FIG. 6 also shows a second picture element, with a lateral extent indicated by a dashed line 78, including a second display area 80. The first wall 20a separates the first display area 24 and the second display area 80. The first wall 20a has an enlarged wall portion 82 which is enlarged relative to a different portion 84 of the first wall. The enlarged wall portion 82 is located between the first 24 and second 80 display areas. In FIG. 6, the enlarged wall portion 82 comprises two enlarged portions, one along a side of the first display area 24 and one along a side of the second display area 80. However, in other examples the enlarged wall portion may comprise one enlarged portion along either the side of the first display area 24 or along the side of the second display area 80. In FIG. 6, the enlarged wall portion 82 is symmetric about a center of the first wall 20a. In other examples, the enlarged wall portion may be asymmetrically located, as described above with reference to FIG. 2. The enlarged wall portion 82 in FIG. 6 has a circular cross-section however its cross-section may be of any shape, as described previously with reference to FIG. 2, for example.

The spacer contact surface 86 is formed by the enlarged wall portion 82 in FIG. 6. As described above, in other examples, the spacer contact surface may be partly formed by the enlarged wall portion and partly formed by another surface. The surface of the spacer (not shown) at least partly overlaps the spacer contact surface 86 in FIG. 6.

Figure 7:
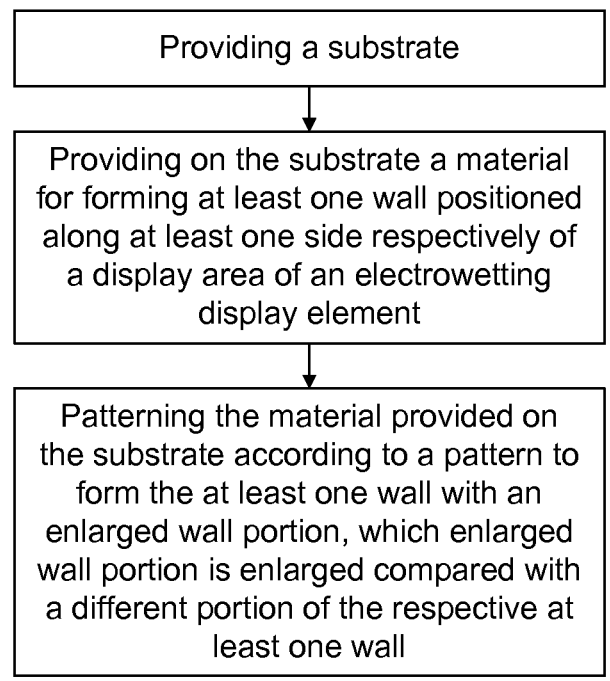
FIG. 7 shows a flow diagram of an example method of manufacturing a support plate for an electrowetting display device.

Examples may also relate to a method of manufacturing a first support plate for an electrowetting display device. An example method of manufacturing is shown in FIG. 7. Features illustrated in FIG. 7 are similar to those described above with reference to FIGS. 1 to 6; corresponding descriptions apply.

During the manufacturing process of the display device, the first support plate may be manufactured entirely, or may be provided during the manufacturing process as a partly or completely assembled support plate.

When manufacturing the first support plate according to an example, the substrate 7 is provided. Then, the electrode 17 is provided on the substrate 7. Subsequently, the insulating layer 13, which in this example includes the barrier layer 16 and the hydrophobic layer 15, is provided on the electrode 17. The barrier layer may be formed of a dielectric material. The providing of the dielectric material, for example to form the barrier layer may be provided using Chemical Vapor Deposition (CVD) or Physical Vapor Deposition (PVD) for example sputter deposition or electron beam evaporation where temperature, pressure and power are controlled appropriately, as would be understood by the skilled person. The hydrophobic layer 15 may then be provided on the barrier layer, or in other examples on the electrode, for example by a wet coating process such as slit coating, flexoprinting, spin coating or dip coating as is well known in the art. The hydrophobic layer in the examples given here is a continuous uninterrupted layer of the first support plate common to all picture elements.

The method of manufacturing a support plate according to examples includes providing on the substrate a material for forming at least one wall positioned along at least one side respectively of a display area of an electrowetting display element. In an example, the material for forming the first wall 20a is provided on the hydrophobic layer 15 which is supported by the substrate 7 but in other examples the material for forming the first wall 20a may be provided directly on the substrate 7. The material provided on the substrate may be patterned according to a pattern to form at least one wall with an enlarged wall portion, which enlarged wall portion is enlarged compared with a different portion of the respective at least one wall. In an example, the first wall 20a is patterned according to a pattern such that the first wall 20a has an enlarged wall portion 30 as described previously for example, which is enlarged relative to a different wall portion 32. The patterning may be performed using photolithography using an SU8 photoresist material, for example, as would be well known to the skilled person.

The patterning the material may also comprise forming a recess 70 in the enlarged wall portion 30. The recess 70 may be shaped to receive at least part of a spacer. The recess may be formed using photolithography in some examples. Alternatively, the recess may be formed when the first support plate and the second support plate are brought together, for example when a material of the spacer contact surface is softer than the surface of the spacer such that the recess is created when the spacer is pushed into contact with the spacer contact surface, i.e. when pressure is applied to the spacer contact surface by the spacer, for example due to pressure applied to the spacer in a direction towards the spacer contact surface. A recess created in this way will be formed with a shape which corresponds with a shape of the part of the spacer which enters and thereby creates the recess.

When the at least one wall includes a first wall and at least one further wall, the pattern may be configured in examples such that the patterning the material forms a wall structure for the electrowetting display device, the wall structure including the first wall and the at least one further wall. For example, such a method may be used to manufacture the support plate shown in FIG. 2, which comprises first 20a, second 20b, third 60 and fourth 66 walls, i.e. four walls, forming a wall structure. In other examples, the wall structure may be formed of other numbers of walls, such as two walls. The wall structure comprises an enlarged wall portion, as described above for example.

Once the first support plate is manufactured it may be assembled with a pre-manufactured second support plate, to assemble one or more electrowetting elements by attaching the first and second support plates together, for example using an adhesive seal at an outermost perimeter of an array of the one or more electrowetting elements, after having provided the first and second fluids in the space to be formed between the first and second support plates. The skilled person will readily appreciate suitable techniques for this.

It is to be appreciated that in further examples, other manufacturing methods may be used to manufacture the first support plate.

The manufacturing of the second support plate may comprise providing a material to form the spacer on a substrate. For example, the spacer may be formed on the substrate by patterning the spacer forming material. In further examples, the spacer may be formed integrally with a part of the second support plate which does not form the spacer.

The above examples are to be understood as illustrative examples. Further examples are envisaged. For example, an electrowetting display device may comprise a plurality of picture elements in accordance with the above examples. The plurality of picture elements may be arranged according to a pattern. The pattern may be a regular or repeating arrangement of picture elements; for example, alternate wall junctions, i.e. every other wall junction when viewing the matrix of picture elements in plan view, may provide at least part of the spacer contact surface and may be formed as illustrated in FIG. 1. In some examples, the enlarged wall portion may be located in the same region of each of the plurality of picture elements. The enlarged wall portion may also be the same size and shape in each of the plurality of picture elements such that the display area of each of the plurality of picture elements is substantially the same size and shape. In further examples, the spacer may be arranged in the same location and may be the same size and/or shape in each of the plurality of picture elements.

In the above-described example shown in FIGS. 1 and 2, each wall 20a, 20b, 60 and 66 has an enlarged wall portion. The enlarged wall portions of each of the walls are adjacent to each other and together form a combined enlarged wall portion which forms the spacer contact surface. In further examples, some of the walls of a picture element may comprise an enlarged wall portion and some may not. For example, if a plurality of the walls of the picture element include an enlarged wall portion, the plurality of enlarged wall portions may not be adjacent to each other. For example, the plurality of enlarged wall portions may be separated by one or more of the different wall portions. In such an example, each of the plurality of enlarged wall portions may be considered to form at least part of a spacer contact surface. For example, there may be a spacer contact surface formed by each of the plurality of enlarged wall portions such that the picture element comprises a plurality of spacer contact surfaces.

In the examples above, the walls 20a, 20b, 20c, 20d of a picture element 1 are described as separate wall elements. However, a plurality of walls, for example the four walls of a picture element or all the walls of a plurality of picture elements, may be formed together i.e. at the same time. For example, a plurality of walls may be formed integrally with each other such that they form a continuous wall structure.

It is to be understood that any feature described in relation to any one example may be used alone, or in combination with other features described and may also be used in combination with one or more features of any other of the example, or any combination of any other of the examples. Furthermore, equivalents and modifications not described above may also be employed without departing from the scope of the accompanying claims.

What is claimed is:

1. An electrowetting display device comprising:
a first support plate comprising a first display area and a first wall positioned along a first side of the first display area, the first wall having an enlarged wall portion, the enlarged wall portion being enlarged compared with a different portion of the first wall;
a second support plate comprising a spacer protruding from the second support plate in a direction towards the first support plate;
a first fluid and a second fluid, the first fluid and the second fluid positioned between the first support plate and the second support plate, the first fluid immiscible with the second fluid, the first fluid adjoining at least part of the first display area; and
a spacer contact surface for contact by a surface of the spacer, the surface of the spacer at least partly overlapping the spacer contact surface,
the spacer contact surface at least partly formed by the enlarged wall portion of the first wall.

2. The electrowetting display device according to claim 1, wherein at least one of the first support plate or the second support plate comprises at least one flexible material to be deformable such that, upon deformation of the at least one of the first support plate or the second support plate, the spacer is movable towards the enlarged wall portion to contact at least part of the spacer contact surface at least partly overlapped by the surface of the spacer.

3. The electrowetting display device according to claim 1, wherein the surface of the spacer contacts at least part of the spacer contact surface.

4. The electrowetting display device according to claim 1, wherein first area of the spacer contact surface is larger than second area of the surface of the spacer.

5. The electrowetting display device according to claim 1, wherein a first part of the spacer contact surface contacts the surface of the spacer, the spacer contact surface comprising a border area, the border area being a second part of the spacer contact surface not in contact with the surface of the spacer and surrounding the first part of the spacer contact surface.

6. The electrowetting display device according to claim 5, wherein a center of the surface of the spacer is one of: coincident or not coincident with a center of the spacer contact surface.

7. The electrowetting display device according to claim 5, wherein the first fluid is absent from between the spacer contact surface and the surface of the spacer.

8. The electrowetting display device according to claim 5, the border area having a radial extent between a first point on a perimeter of the first part of the spacer contact surface and a second point on a perimeter of the spacer contact surface, the radial extent being substantially perpendicular to a tangent of the perimeter of the spacer contact surface, the radial extent at least equal to a maximum distance across the border area wettable by the first fluid, the maximum distance substantially perpendicular to the tangent and taken from the perimeter of the spacer contact surface and across the border area.

9. The electrowetting display device according to claim 8, wherein the radial extent of the border area is one of: substantially equal or unequal around the perimeter of the first part of the spacer contact surface.

10. The electrowetting display device according to claim 1, wherein the enlarged wall portion comprises a recess shaped to receive at least part of the spacer.

11. The electrowetting display device according to claim 10, wherein the recess is one or more of:
a first region of the enlarged wall portion with a smaller height compared with a second region of the enlarged wall portion different from the first region, or
one or more of: a cut-out, depression, removed part, cavity or hole in the enlarged wall portion.

12. The electrowetting display device according to claim 10, the recess having an opening with a shape corresponding with a cross-sectional shape of the spacer.

13. The electrowetting display device according to claim 10, wherein the spacer is received within the recess, and the first support plate and the second support plate are joined together between the spacer and the recess.

14. The electrowetting display device according to claim 10, wherein the spacer has a tapered outer surface tapering in a direction towards the first support plate, at least a part of the tapered outer surface being in contact with an opening of the recess through which the spacer is received.

15. The electrowetting display device according to claim 1, the first support plate comprising a second wall positioned along a second side of the first display area, the first wall joining the second wall at a wall junction, the spacer contact surface being part of the wall junction.

16. The electrowetting display device according to claim 1, comprising a first picture element comprising the first display area and a second picture element comprising a second display area, the first wall separating the first display area from the second display area, the first wall positioned along a side of the second display area, at least part of the enlarged wall portion of the first wall positioned between the first display area and the second display area.

17. The electrowetting display device according to claim 1, comprising:
- a first picture element comprising the first display area;
- a second picture element comprising a second display area, a second wall positioned along a second side of the first display area and along a first side of the second display area, the second wall separating the first display area from the second display area;
- a third picture element comprising a third display area, a third wall positioned along a second side of the second display area and along a first side of the third display area, the third wall separating the second display area from the third display area; and
- a fourth picture element comprising a fourth display area, a fourth wall positioned along a side of the fourth picture element,
- the first wall, the second wall, the third wall and the fourth wall joining each other at a wall junction, the spacer contact surface formed as being part of the wall junction.

18. The electrowetting display device according to claim 17, wherein one or more of: the second wall, the third wall, or the fourth wall comprises respectively a second enlarged wall portion, the respective second enlarged wall portion being enlarged compared to a different portion of the respective one of the second wall, the third wall, or the fourth wall, a second spacer contact surface of the respective one of the second wall, the third wall, or the fourth wall at least partly formed by the respective second enlarged wall portion.

19. The electrowetting display device according to claim 1, wherein the enlarged wall portion of the first wall comprises one or more of:
- a widening of the first wall compared with the different portion of the first wall, the widening being taken in a direction parallel to a plane of the first display area; or
- a heightening of the first wall compared with the different portion of the first wall, the heightening being taken in a direction perpendicular to the plane of the first display area.

20. The electrowetting display device according to claim 1, wherein the spacer contact surface is one or more of: planar, substantially circular, substantially rectangular, substantially square, or substantially elliptical.

21. The electrowetting display device according to claim 1, wherein the surface of the spacer at least partly overlapping the spacer contact surface is one or more of: planar, substantially circular, substantially rectangular, substantially square, and substantially elliptical.

22. The electrowetting display device according to claim 1, wherein at least part of the spacer contact surface is more wettable to the second fluid than to the first fluid.

23. The electrowetting display device according to claim 1, wherein the first side of the first display area is non-linear for a part of the first side adjoining the first wall.

24. The electrowetting display device according to claim 1, wherein a first display area width of the first display area is greater than a second display area width of the first display area,
- the first display area width being taken from a first point of the different portion of the first wall to a first opposite point on an opposite side of the first display area, the opposite side being opposite to and across the first display area from the first side; and
- the second display area width being taken from a second point of the enlarged wall portion on the first side of the first display area to a second opposite point on the opposite side,
- the first display area width being substantially parallel to the second display area width.

25. The electrowetting display device according to claim 1, the first support plate comprising a first electrode and the electrowetting display device comprising a second electrode in contact with the second fluid, a configuration of the first fluid and the second fluids switchable using a voltage applied between the first electrode and the second electrode.

26. The electrowetting display device according to claim 1, the spacer contact surface substantially entirely being a surface of the enlarged wall portion of the first wall.

27. The electrowetting display device according to claim 1, the first wall having a substantially zero height.

28. The electrowetting display device according to claim 1, a length of the spacer in a direction perpendicular to a plane of the first display area being less than a distance between a part of the second support plate which does not comprise the spacer and the spacer contact surface in the direction perpendicular to the plane of the first display area.

* * * * *

UNITED STATES PATENT AND TRADEMARK OFFICE
CERTIFICATE OF CORRECTION

| | |
|---|---|
| PATENT NO. | : 9,529,186 B1 |
| APPLICATION NO. | : 14/317404 |
| DATED | : December 27, 2016 |
| INVENTOR(S) | : Schram |

Page 1 of 1

It is certified that error appears in the above-identified patent and that said Letters Patent is hereby corrected as shown below:

In the Claims

In Column 18, Line 5, in Claim 4, delete "first" and insert -- a first --, therefor.

In Column 18, Line 6, in Claim 4, delete "second" and insert -- a second --, therefor.

In Column 19, Line 22, in Claim 17, delete "surface formed as" and insert -- surface --, therefor.

In Column 20, Line 32, in Claim 25, delete "fluids" and insert -- fluid --, therefor.

Signed and Sealed this
Eighteenth Day of April, 2017

Michelle K. Lee
*Director of the United States Patent and Trademark Office*